United States Patent [19]

Deagan

[11] Patent Number: 5,749,316

[45] Date of Patent: May 12, 1998

[54] AUTOMATIC SELF-FILLING BIRD FEEDER

[75] Inventor: John C. Deagan, Long Grove, Ill.

[73] Assignee: Thomas R. Vigil, Barrington, Ill.

[21] Appl. No.: 785,875

[22] Filed: Jan. 21, 1997

[51] Int. Cl.⁶ .................................................. A01K 39/00
[52] U.S. Cl. ......................................................... 119/57.8
[58] Field of Search .............................. 119/57.8, 57.91, 119/57.92, 51.12, 52.2

[56] References Cited

U.S. PATENT DOCUMENTS

| | | | |
|---|---|---|---|
| 3,653,361 | 4/1972 | Holliday | 119/52 |
| 4,304,262 | 12/1981 | Icking | 137/624.2 |
| 5,339,767 | 8/1994 | Krag | 119/57.8 |
| 5,438,956 | 8/1995 | Thigpen | 119/57.92 |
| 5,549,075 | 8/1996 | Golden | 119/57.92 |

*Primary Examiner*—Thomas Price
*Attorney, Agent, or Firm*—Thomas R. Vigil

[57] ABSTRACT

The automatic self-filling bird feeder comprises: a container for receiving bird seed, an electrically powered blower mounted in the container and having an air outlet for supplying pressurized air to the interior of the container; a seed filling opening in the container for supplying seed to the container; a cover for the seed filling opening; a tube assembly extending from the container; an enclosed bird feeder housing mounted to the outer end of the tube assembly; circuitry for sensing the level of seed in the seed container; and circuitry responsive to the level of seed sensed in the bird feeder housing for controlling the operation of the electrically powered blower.

18 Claims, 2 Drawing Sheets

AUTOMATIC SELF-FILLING BIRD FEEDER

BACKGROUND OF THE INVENTION

1. Field of the Invention

The present invention relates to an automatic self-filling bird feeder and, in particular, to an electrically powered blower operated automatic self-filling bird feeder which utilizes pressurized air to move seeds from a lower container to an upper bird feeder housing.

2. Description of the Related Art Including Information Disclosed Under 37 CFR §§ 1.97–1.99

Heretofore, various automatic self-filling bird feeders have been proposed. Examples of some of these bird feeders are disclosed in the following U.S. Pat. Nos. :

| U.S. Pat. No. | Patentee |
| --- | --- |
| 3,653,361 | Holliday |
| 4,304,262 | Icking |
| 5,339,767 | Krag |
| 5,438,956 | Thigpen |
| 5,549,075 | Golden |

The Holliday U.S. Pat. No. 3,653,361 teaches an automatic self-filling bird feeder that uses a screw conveyor as the mechanism for moving seed from a lower container to an upper bird feeder housing.

The Icking U.S. Pat. No. 4,304,262 discloses a bird feeding device which is actuated by pneumatic pulses.

The Krag U.S. Pat. No. 5,339,767 discloses a bird feeder having a hollow interior for holding a supply of bird seed. The lower end of a pipe is embedded in the ground and the upper end of the pipe is open. A coil spring is positioned within the pipe and bird seed is placed in the pipe. A plunger is slidably positioned within the pipe and positioned on the upper end of the coil spring. A winch is provided for pulling the plunger downwardly against the action on the coil spring by means of a cable so that the area above the plunger can be filled with bird seed. Then, the winch is released incrementally to allow the coil spring to push bird seed upwardly to the bird feeder where the seed is pushed through a screen into the bird feeder.

The Thigpen U.S. Pat. No. 5,438,956 discloses a device for dispensing bird seed to an elevated location, including a tubular member having an auger therein for moving bird seed from a lower position to an upper position.

The Golden U.S. Pat. No. 5,549,075 discloses an automatic bird feeder comprising a lower storage container and an upper bird feeder with a feed tube connected therebetween. A drive unit is provided for operating an auger or telescoping shaft located within the feed tube for moving feed upwardly to the bird feeder.

SUMMARY OF THE INVENTION

According to the present invention there is provided an automatic self-filling bird feeder comprising: a container for receiving bird seed, an electrically powered blower mounted in the container and having an air outlet for supplying pressurized air to the interior of the container; a seed filling opening in the container for supplying seed to the container; a cover for the seed filling opening; a tube assembly extending from the container; an enclosed bird feeder housing mounted to the outer end of the tube assembly; circuitry for sensing the level of seed in the seed container; and circuitry responsive to the level of seed sensed in the bird feeder housing for controlling the operation of the electrically powered blower.

DESCRIPTION OF THE PREFERRED EMBODIMENT(S)

Figure 1:
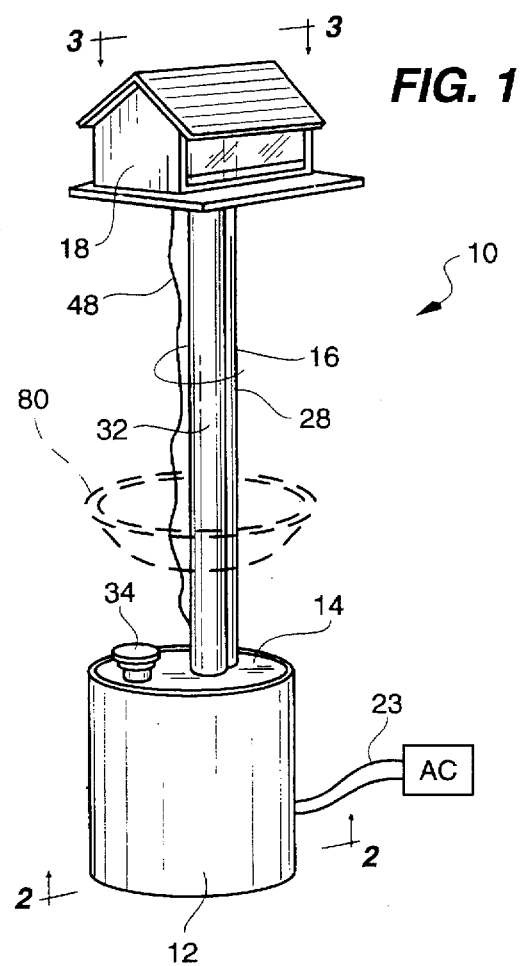
FIG. 1 is a perspective view of one embodiment of the automatic self-filling bird feeder of the present invention and shows a lower container adapted to be positioned on the ground or buried beneath the ground, an upwardly extending tube assembly and a bird feeder housing at the upper end of the tube assembly.

Referring now to the drawings in greater detail, there is illustrated in FIG. 1, an automatic self-filling bird feeder 10 which is constructed according to the teachings of the present invention. The bird feeder 10 includes a lower container 12 which can be a five or eight gallon container having a cover 14 through which extends a tube assembly 16, which extends upwardly a distance of three to ten feet to a house-shaped bird feeder housing 18.

Figure 2:
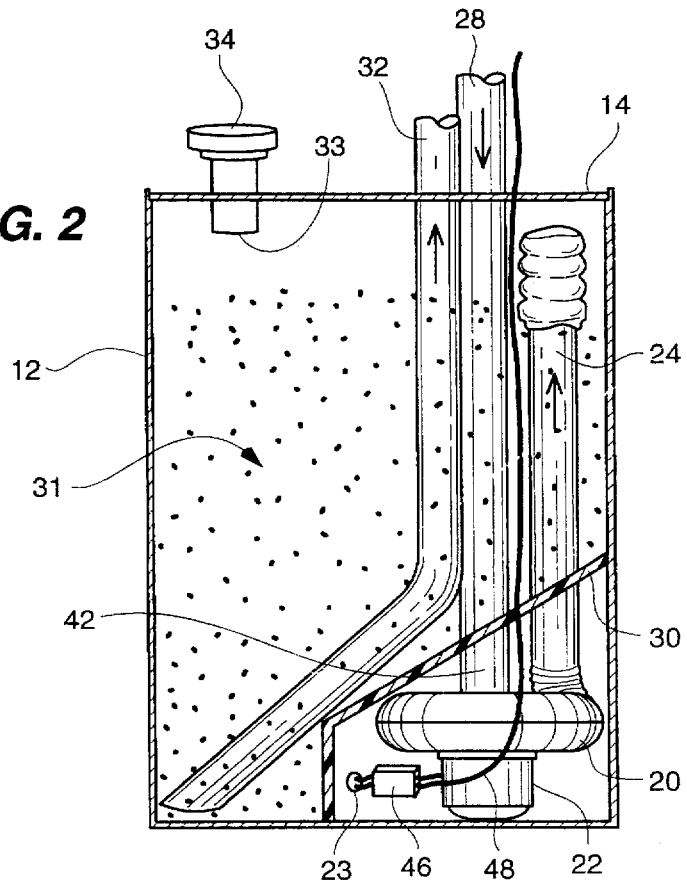
FIG. 2 is a cross-section of the container shown in FIG. 1 and shows seed in the container and a blower motor and blower for supplying pressurized air to the interior of the container.

As best shown in FIG. 2, the container 12 has mounted therein a blower 20 and a motor 22 which is electrically operated by AC or DC power by means of a power cord 23. An outlet pipe 24 for the blower 20 extends upwardly to a position just below the top or cover 14 for the container 12 and opens into the container 12. An air inlet or intake pipe 28 of the tube assembly 16 extends downwardly from the feeder housing 18 to the blower 20 as shown.

If desired, a baffle plate 30 can be provided inside the container 12 for enclosing the blower 20 and the motor 22 inside the container 12 to prevent dust and seed 31 from entering the area of the blower 20 and motor 22.

As shown, a seed outlet pipe 32 forms part of the tube assembly 16 and extends from a lower corner of the container 12 angularly upwardly and then vertically upwardly to the feeder housing 18. The container 12 further includes the cover 14 which has openings for the tube assembly 16 and a fill opening 33 for seed covered by an air tight filler cap 34.

Figure 4:
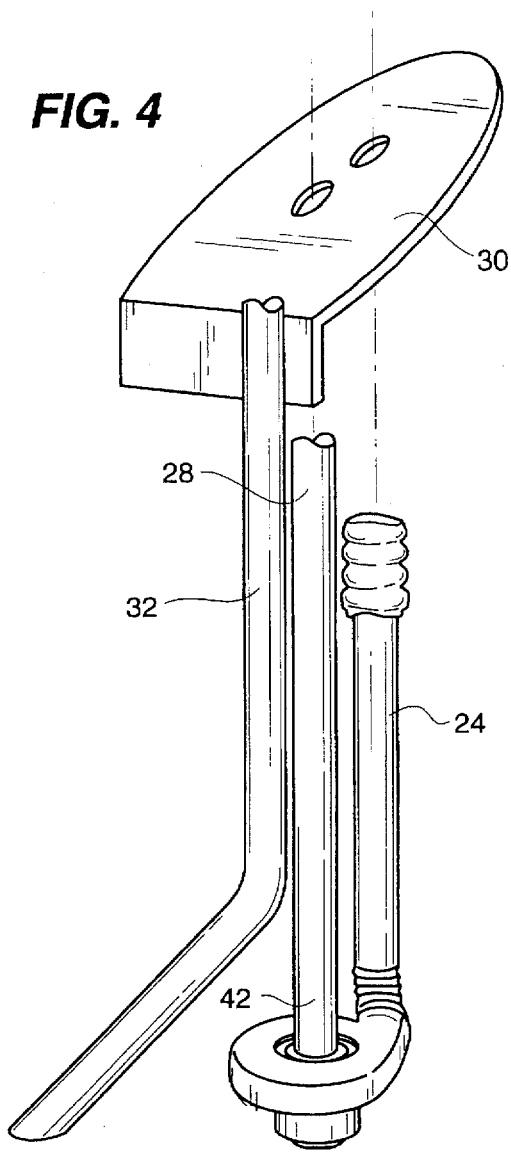
FIG. 4 is a fragmentary view of the tubing assembly inside the container including an electrically powered blower, a tube outlet inside the container, an air inlet tubing and the seed dispensing tubing.

These elements are also shown in FIG. 4.

Figure 3:
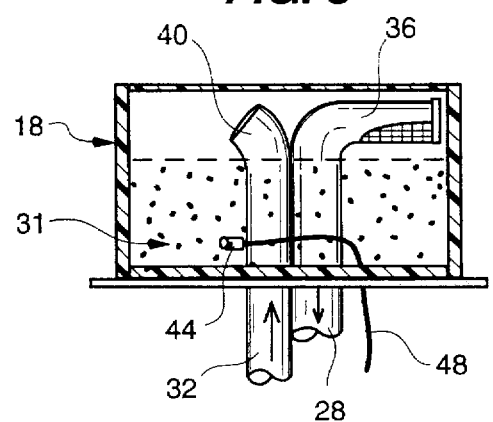
FIG. 3 is a sectional view of the bird feeder housing showing the upper end of a seed dispensing tube and the upper end of an air intake tube which form the tube assembly.

In FIG. 3 there is illustrated a cross-section of the bird feeder housing 18 connected to an upper end 36 of the air intake pipe 28 and an upper end 40 of the seed outlet pipe 32 which open into the bird feeder housing 18. A lower end 42 of the air intake pipe 28 is connected to the blower 20.

Although the air intake pipe 28 can open outside the container 12 at a lower level, it may be preferable to have it open in the feeder housing 18 for several reasons. First of all, the second pipe 28 gives more strength to the tube assembly 16 which supports the bird feeder housing 18 at a distance above the container 12. Secondly, having the upper end of the intake pipe 28 located within the feeder housing 18 prevents water, dust, etc. from entering into the air intake pipe 28 connected to the blower 20. Additionally, the pipes 28 and 32 can be a one piece two chamber extruded metal conduit for greater rigidity.

As shown, in the feeder housing 18 is located a seed level sensor 44 which, in one embodiment can be a photo sensitive device 44. Of course, it will be understood that other level sensors can be utilized in place of a photo electric sensor.

It is to be understood that the seed level sensor device 44 will be coupled to a power switch 46 for the motor 22 and this coupling can be by a wire cable 48, extending downwardly with the tube assembly 16 or the coupling can be effected by an infrared or radio frequency signal that is sent to the power switch 46, which is preferably located inside the container 12, to protect it from the elements. A signal sent from the seed level sensing device 44 over the cable 48 or by a radio frequency signal will then turn off and turn on the motor 22 as the level of seed 31 rises and falls inside the bird feeder housing 18.

Figure 5:
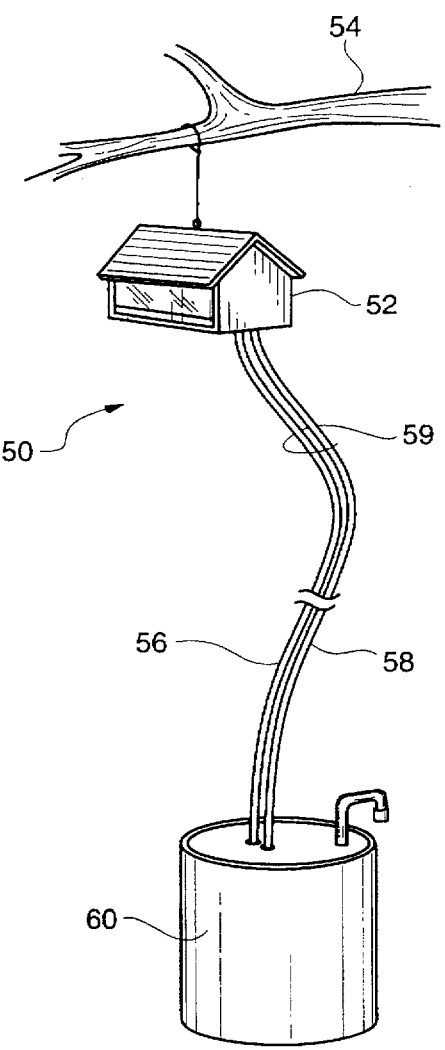
FIG. 5 is a perspective view of another embodiment of the automatic self-filling bird feeder of the present invention including a container and a flexible tube assembly leading to a bird feeder housing which can be hung from a branch of a tree or other elevated structure.

In FIG. 5 there is illustrated a modified version of an automatic self-filling bird feeder 50 constructed according to the teachings of the present invention. In this embodiment, a bird feeder housing 52 of the feeder 50 is hung from an elevated structure such as a branch 54 of a tree. Then, instead of a rigid tube assembly, one or two flexible tubes 56, 58 extend from the bird feeder housing to a five or eight gallon container 60. The structure inside the container 60 can be the same as that shown in FIGS. 2 and 4 in the container 12. As one alternative, an air inlet pipe 62 can extend out of the container 60 as shown for sucking air from the atmosphere at a lower level into the container 60. Again, this construction may not be preferred since if there is a goodly amount of snow on the ground, since the air inlet pipe 14 could become clogged. Again, the tubes 56, 58 can comprise two flexible tubings 56 and 58 forming a flexible tubing assembly 59 which will extend between the container 60 and the bird feeder housing 52 in much the same way as the two pipes 28 and 32 of the tube assembly 16 shown in FIGS. 1-4.

Figure 6:
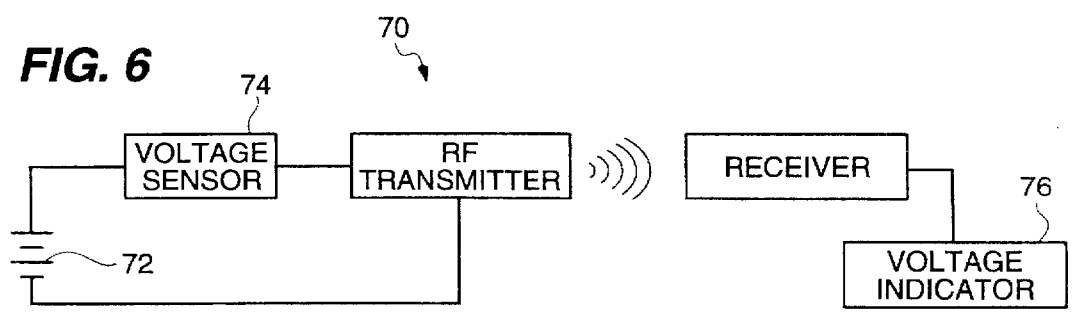
FIG. 6 illustrates a battery operated power supply for the bird feeder.

In FIG. 6 is illustrated a battery operated power supply 70 for the bird feeder 10 or 50.

From the foregoing description, it will be apparent that the automatic self-filling bird feeder 10 or 50 of the present invention has a number of advantages, some of which have been described above and others of which are inherent in the invention.

In particular, the bird feeder 10 or 50 utilizes pressurized air as the moving force for moving seed from the lower container 12 or 60 to the upper bird feeder housing 18 or 52 which is believed to be a simpler arrangement than a spring biased plunger or an auger.

Furthermore, the structure described above is believed to be less expensive and less subject to malfunction than the previously proposed automatic self-filling bird feeders.

Further from the foregoing description, it will be apparent that modifications can be made to the bird feeder without departing from the teachings of the present invention. For example, the tube assembly 59 can be made of two flexible tubings 56 and 58, as shown in FIG. 5, such that the bird 20 feeder housing 52 can be hung at a higher level, such as from a tree.

Also, the power supply 70 for the motor 22 can be AC or DC and in some instances can be a DC battery 72 which is mounted inside or outside the container 12 or 60 thereby to provide a self contained, electrically operated, automatic self-filling bird feeder 10 or 50 which does not expose an AC power supply cord 23 to the elements.

When a self-contained power supply 70 is utilized with the bird feeder 10 or 50, the battery 72 can be provided with a voltage sensor 74 for indicating visually on the container 12 or 60 or via a radio frequency signal to a display unit 76 within a house that the battery voltage is low and the battery should be recharged or replaced.

Further, a heated bird bath 80, shown in phantom in FIG. 1, can be mounted above the container 12 or 60.

Accordingly, the scope of the invention is only to be limited as necessitated by the accompanying claims.

I claim:

1. An automatic self-filling bird feeder comprising:
   a container for receiving bird seed;
   an electrically powered blower mounted in said container and having an air outlet for supplying pressurized air to the interior of said container;
   a seed filling opening in said container for supplying seed to said container;
   a cover for said seed filling opening;
   a tube assembly extending from said seed receiving container;
   an enclosed bird feeder housing mounted to an outer end of said tube assembly;
   means for sensing the level of seed in said seed receiving container; and
   means responsive to said level of seed sensed in said bird feeder housing for controlling the operation of said electrically powered blower.

2. The bird feeder of claim 1 wherein said seed receiving container includes a baffle over said motor and blower for protecting said motor and blower from dust and seed.

3. The bird feeder of claim 1 wherein said tube assembly includes a seed supply tube which extends from a lower area inside said container upwardly to said bird feeder housing.

4. The bird feeder of claim 1 wherein said tube assembly includes an air inlet tubing which extends from said blower outwardly and upwardly from said container to said bird feeder housing.

5. The bird feeder of claim 4 wherein an upper end of said air inlet tubing includes a screen to prevent seed from being drawn back into said seed receiving container.

6. The bird feeder of claim 1 wherein an air inlet pipe extends from said blower and said container to an elevated location just outside said seed receiving container.

7. The bird feeder of claim 1 wherein said means for sensing the level of seed in said bird feeder housing includes means for transmitting a signal to a power switch controlling power to a motor for said blower.

8. The bird feeder of claim 6 wherein said power switch is hard wired connected to said seed level sensing means.

9. The bird feeder of claim 6 wherein said power switch receives RF signals from said seed level sensing means.

10. The bird feeder of claim 6 wherein said motor is powered by AC power supplied thereto by an AC power cord.

11. The bird feeder of claim 6 wherein said motor is powered by a DC battery source mounted outside or inside said seed receiving container.

12. The bird feeder of claim 10 including a voltage sensing circuit for sensing the level of voltage on said battery and an RF transmitter for transmitting that information to a voltage indicating device for indicating the voltage level.

13. The bird feeder of claim 11 wherein said means for indicating the voltage level includes an RF receiver for receiving a signal from said RF transmitter connected to said voltage indicator for indicating that said battery source for said outside bird feeder is low and needs to be recharged or replaced.

14. The bird feeder of claim 1 wherein said bird feeder housing is adapted to be hung from an elevated structure such as a branch or a tree and said tube assembly includes at least one flexible tubing for supplying seed to said bird feeder housing.

15. The bird feeder of claim 1 wherein said means for sensing the level of seed in said bird feeder housing includes a photo-electric device.

16. The bird feeder of claim 1 wherein said seed receiving container is a five (5) gallon container.

17. The bird feeder of claim 1 wherein said bird feeder housing is located between three (3) and eight (8) feet above said seed receiving container.

18. The bird feeder of claim 1 including a heated bird bath mounted above said container.

* * * * *

UNITED STATES PATENT AND TRADEMARK OFFICE
CERTIFICATE OF CORRECTION

PATENT NO.   : 5,749,316
DATED        : May 12, 1998
INVENTOR(S)  : John C. Deagan It is certified that error appears in the above-indentified patent and that said Letters Patent is hereby corrected as shown below:

On the Title Page, "[73] Assignee: Thomas R. Vigil, Barrington, Ill." should be -- [73] Assignee: Thomas R. Vigil, a 1/2 interest, Barrington, Ill. --

Signed and Sealed this

Twenty-fifth Day of August, 1998

Attest:

BRUCE LEHMAN

*Attesting Officer*   *Commissioner of Patents and Trademarks*